United States Patent [19]

Meeks

[11] 4,281,727
[45] Aug. 4, 1981

[54] ELECTRONIC SCALE AND BATTERY SUPPORT

[75] Inventor: Fredrick T. Meeks, Asheboro, N.C.

[73] Assignee: General Electric Company, New York, N.Y.

[21] Appl. No.: 102,874

[22] Filed: Dec. 12, 1979

[51] Int. Cl.³ .......................................... G01G 19/44
[52] U.S. Cl. .................................. 177/128; 177/177; 177/264; 429/98
[58] Field of Search ...................... 177/128, 177–178, 177/264, DIG. 3; 429/100, 98, 96; 324/156; 206/333; 339/152

[56] References Cited

U.S. PATENT DOCUMENTS

| | | | |
|---|---|---|---|
| 2,812,422 | 11/1957 | Provi | 177/177 |
| 2,892,010 | 6/1959 | Provi | 174/58 |
| 3,106,602 | 10/1963 | Hartz | 174/60 |
| 3,469,645 | 9/1969 | Provi | 177/210 |
| 3,473,966 | 10/1969 | Fritch | 429/98 |
| 3,478,618 | 11/1969 | Provi | 74/519 |
| 4,041,289 | 8/1977 | Brosh | 177/1 |
| 4,075,402 | 2/1978 | Okamoto | 429/98 |
| 4,173,263 | 11/1979 | Meeks | 177/210 |

Primary Examiner—Joseph W. Hartary

Attorney, Agent, or Firm—John F. Cullen; George R. Powers; Leonard J. Platt

[57] ABSTRACT

In a direct current electronic digital platform scale with a base and a movable cover thereover, a weight-responsive system in the base has electronic structure connected to convert cover movement to a digital weight readout. A switch is provided that is closed by cover movement to activate the electronic structure and the readout, and a convenient 9 volt battery is supported in the base and wired to supply power to the switch and electronic structure to indicate weight. To this general arrangement, an improvement in the battery support has an opening through the base to the interior and a box-like molded plastic battery receptacle is supported in the opening with the box extending into the base. A second opening through the receptacle inside the base permits the wires to connect to a battery harness inside the receptacle and a matching box or receptacle cover is latchably connected to secure the cover to the base and close off the receptacle such that the cover is flush with or coplanar with the base. This provides a convenient, inexpensive, easily assembled, common arrangement for renewing the battery in the base of the electronic platform scale from outside.

3 Claims, 4 Drawing Figures

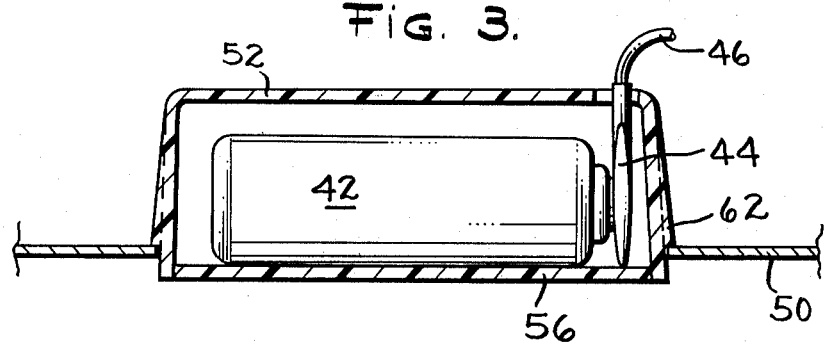
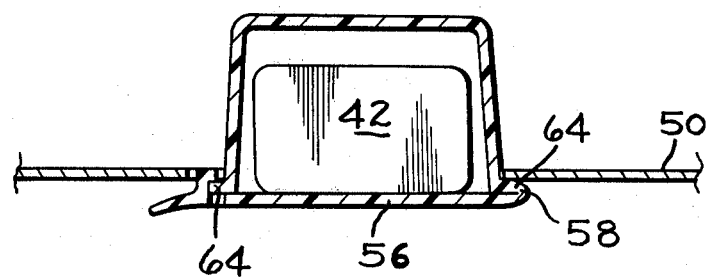

ELECTRONIC SCALE AND BATTERY SUPPORT

BACKGROUND OF THE INVENTION

1. Field of the Invention

The invention relates to a digital platform scale of the general type of home weighing scale that is connected to an electrical digital readout and, more particularly, to a battery operated scale and the receptacle structure for the battery for convenience and easy replacement from outside the scale.

2. Description of the Prior Art

A common household bathroom scale having a base and a weight supporting cover with an internal lever system biased by a coil spring or other suitable electronic weight detecting means and having a digital readout is well known. Various improvements have been proposed to the general combination that employ digital readouts and such patents are U.S. Pat. Nos. 4,041,289, 3,469,645 and 3,887,797. All these scales are directed to electrically sensing scale movement and translating such movement to suitable readouts such as digital readouts. All employ some internal resistance because of the scale mechanism and to this general combination an improved low friction system is shown in U.S. Pat. No. 4,173,263 of common assignment. Such patent is operable by the conventional 9 volt square-type battery to supply power to the electronic means for powering the scale sensor and readout.

SUMMARY OF THE INVENTION

Briefly described, the invention is directed to a digital platform scale with a base and movable cover thereover with a weight-responsive system in the base and having electronic means connected to convert cover movement to a digital weight readout and having a switch which is closed by cover movement to activate the electronic means and readout. Power is supplied by a conventional 9 volt battery supported in the base and wired through the switch and electronic means to indicate the weight. In this general combination, an improvement is provided in the battery support comprising an opening through the base to its interior where a battery receptacle, preferably in the form of a walled integral molded plastic box, is supported in the base, the receptacle having a suitable opening through it inside the base for wire connection to a battery dual terminal in the receptacle. The receptacle has suitable oppositely facing projections on its opposing walls to abut opposite base surfaces so that the receptacle can be snapped into the base opening to lock it therein. If plastic is used, a cover over the receptacle may be provided as an integral part. The battery receptacle is disposed completely within the base and the cover is substantially flush or coplanar with the base whereby it is not necessary to expose the internals of the scale mechanism and the battery can be conveniently changed by the user from outside the scale. Thus, the main object of the invention is to provide an electronic battery operated platform scale with a digital readout whereby the battery receptacle is fully protected at all times, is inexpensive to manufacture and assemble, has no external projecting parts, and allows the battery to be conveniently replaced by the user without exposing the internals of the scale.

BRIEF DESCRIPTION OF THE DRAWING

FIG. 3 is a cross-section on line 3—3 of FIG. 1, and FIG. 4 is a cross-section on line 4—4 of FIG. 1.

DESCRIPTION OF THE PREFERRED EMBODIMENT

Figure 1:
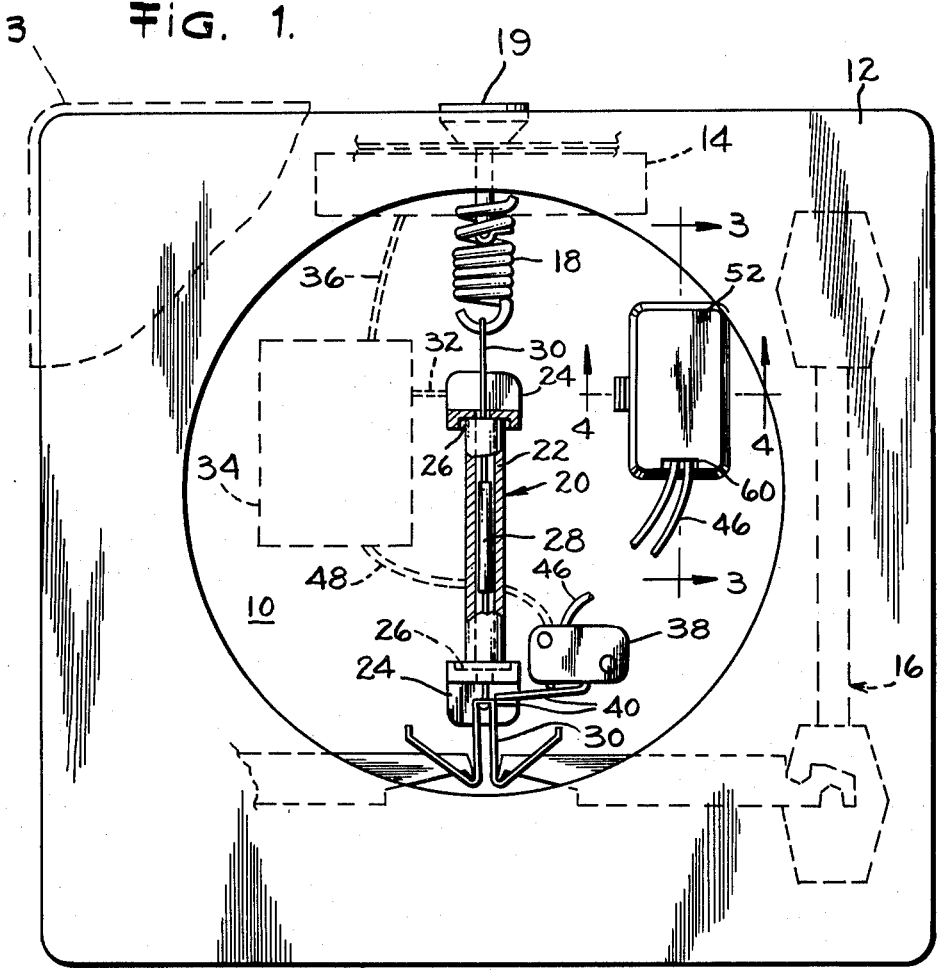
FIG. 1 is a plan view, partly in section, showing a platform scale of the U.S. Pat. No. 4,173,263 type with the invention applied.

Referring to the drawings, a common bathroom-type scale employing the instant invention may take any suitable form such as the rectangular form shown and is a specific improvement on the device shown in U.S. Pat. No. 4,173,263 of common assignment. As such, it includes a base 10 that is closed by a movable weight supporting cover 12 upon which a person stands. The cover 12 is movable in the normal fashion against the fixed base and weight is read in a digital readout 14 through an appropriate window in the decorative overcover 13. The scale is activated by a suitable weight responsive system such as lever system 16 disposed in the base and of the general type as shown in U.S. Pat. Nos. 3,469,645 and 3,478,618. No claim is made to the lever system per se since it is known construction and shown in said patents to convert vertical movement of cover 12 to horizontal movement of the internal lever system 16. As such, movement of the lever system is counter-balanced by an adjustable horizontally disposed coil spring 18 connected to the base and to the lever system in some suitable fashion and has a scale adjustment knob 19 if desired. For operating weight indicating indicia, the connection usually consists of intermediate linkage structure to activate a rack and pinion for rotating a weight indicating dial passing under a window as in said U.S. Pat. No. 3,478,618 or weight may be indicated electronically as in U.S. Pat. No. 4,041,289 or other electrical means well known to convert to a digital readout. These types of structure employ extra and side linkage which inherently involve friction on the movable system to introduce errors.

To overcome friction, the structure of 4,173,263 supra uses a diffential transformer 20 or LVDT as a direct link in the counter-balancing system and the LVDT is disposed between lever system 16 and the counter-balancing spring 18 to connect the two as the only and sole connection therebetween. As shown in said '263 patent, differential transformer 20 is the one direct aligned and sole link between spring 18 and lever system 16 connecting the two at the point of maximum lever movement as seen in FIG. 1. To minimize friction and maximize sensitivity, the transformer is formed of an outer coil winding 22 in the general form of a hollow cylinder that is substantially fixed to the base against aligned longitudinal movement between the spring and levers but is allowed to move or float sideways and vertically by any suitable mounting arrangement such as brackets 24 having enlarged recesses 26 and fixed to the base 10. Thus, the coil floats by adjusting itself in all but the aligned direction in which it is fixed or stationary. Coaxially disposed within the winding is an inner core 28 of a size sufficiently smaller than the central portion of winding 22 so that it is spaced from the winding to prevent any contact between the two during core movement. The core forms the only and direct link through rods 30 with spring 18 at one end and lever system 16 at the other end. Thus, the coil 22 floats in all but the one aligned direction where it must be held for a sensor pickup of movement of the core 28 so continuously adjusts itself against an imperfect mechanical system. Spring 18, core 28, and lever system 16 are always directly aligned and connected by link member 30 at the point of maximum travel when the system is symmetrical about a centerline including spring 18 and core 28. This arrangement, fully described in said U.S. Pat. No. 4,173,263 provides maximum sensitivity and minimum friction at all times on the system. There is substantially no friction whatever except for cutting lines of magnetic force between the core and windings so the sensor LVDT is substantially frictionless.

To actuate digital readout 14, a suitable wire connection 32 is made to an electronic means 34 that may be one or more integrated circuits and which, in turn, is connected by wire 36 to the digital readout 14.

The device is preferably battery operated and activated only upon application of weight by a suitable switch 38 fixed to the base 10 and containing cooperating arms 40, one connected directly to the core rod 28 so that switch 40 is activated only on lever and core movement towards the bottom in FIG. 1. This separates arms 40 on applying weight to the cover and energizes the readout in a substantially frictionless arrangement.

In accordance with the invention, the entire system is powered by a battery supplying direct current and, conveniently, by the well-known rectangular small 9 volt battery 42 as shown in FIGS. 3 and 4. The battery is connected to its conventional dual terminal harness 44 and supplies power through switch 38 by connecting wires 46 to the electronic means 34 by wires 48 and then to readout 14 as clearly shown in FIG. 1.

Because the internal structure of the scale is preset and contains electronic components that should not be accessible or disturbed, the battery powering the system should be readily accessible from outside the scale.

Figure 2:
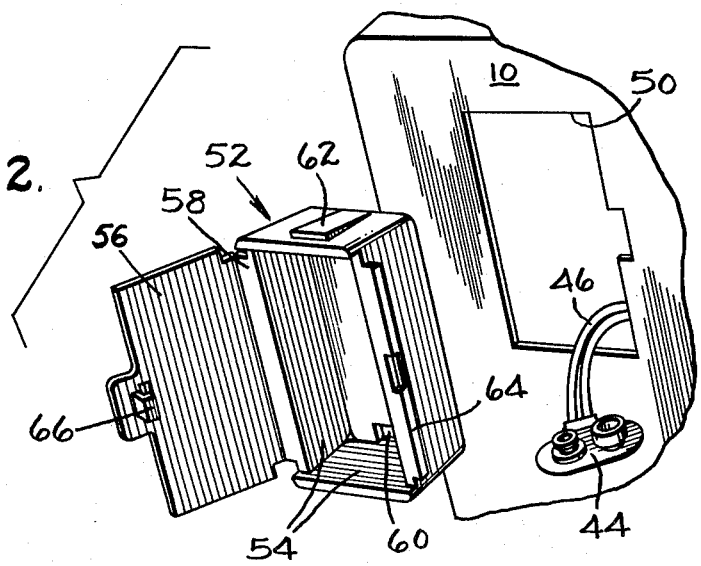
FIG. 2 is an exploded perspective of part of the components shown in FIG. 1.

To this end, an opening 50 is provided through the base to its interior as seen in FIGS. 2–4. Supported directly in the opening 50 is a battery receptacle 52 in the form of a walled box that is an integral or one-piece all plastic box of polypropylene or polyethylene or equivalent having the customary walls as any conventional box. A cover 56 with an integral or living hinge 58 is formed as part of the battery receptacle. In order to avoid any obstructions, the box receptacle 52 is disposed totally within the base through opening 50 and one wall of the receptacle, such as the bottom wall, has an opening 60 inside the base for passage of wires 46 from the dual terminal harness 44 disposed in receptacle 52. The receptacle or walled box 52 is supported in and by base 10 to extend totally within the base by oppositely facing projections 62 and 64 abutting on opposing walls, the projections 62 abutting the inner surface of base 10 and projections 64 abutting the opposite or outer surface of base 10 to support the receptacle entirely within the base around the periphery of the box. When the box is a molded pliable plastic, it has resiliency and may be snapped into opening 50. Cover 56 closes the box by a suitable molded latch 66 that secures the cover to the receptacle 52 and the base when closed.

To avoid any outward projections, the entire receptacle 52 is thus firmly supported inside base 10 such that the cover 56 is coplanar with the base or flush against the base outer surface. While any suitable battery can be used, the 9 volt DC standard battery is preferred and the receptacle 52 is suitably shaped so the battery nests firmly within it as shown in FIGS. 3 and 4 and the dual terminal harness 44 is readily accessible for changing the battery at the bottom of and from outside the scale through the cover 56.

Thus, the present invention provides a convenient, inexpensive, easily-assembled battery support receptacle in a flush or coplanar arrangement in an electronic digital scale that is easily accessible at any time without entering the internal parts of the scale.

While I have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. In a DC electronic digital platform scale having a base and movable cover thereover, a weight-responsive system in the base with electronic means connected to convert cover movement to a digital weight readout, a switch closed by cover movement activating said means and readout, and a battery supported in the base connectively wired to supply power through said switch and said means to indicate weight, an improvement in the battery support comprising, an opening through the base to its interior,
a battery receptacle comprising a walled box peripherally supported by and extending totally within said base,
said opening extending through a wall of said box for said wire connection,
matching box cover means coplanar with the plane of said base and latchably securing thereto in said coplanar plane,
said receptacle comprising a single integral molded plastic with said cover being attached thereto with a living hinge,
whereby a battery is removably supported and connected in the receptacle within the base and accessible outside the scale through said cover.

2. Apparatus as described in claim 1 wherein said DC source is a standard 9 volt rectangular battery,
a dual terminal harness connected to said wires and disposed in the box, and
said receptacle box is rectangular to nest said battery substantially within said base.

3. Apparatus as described in claim 2 wherein said molded receptacle box has oppositely-facing projections on opposing walls abutting opposite base surfaces for snapping the box into the base opening to lock it therein.

* * * * *